United States Patent [19]

Linder

[11] Patent Number: 4,535,543

[45] Date of Patent: Aug. 20, 1985

[54] DYNAMIC FEELER HEAD

[75] Inventor: Kurt Linder, Karlsruhe, Fed. Rep. of Germany

[73] Assignee: Mauser-Werke Oberndorf GmbH, Fed. Rep. of Germany

[21] Appl. No.: 533,009

[22] Filed: Sep. 16, 1983

[30] Foreign Application Priority Data

Sep. 21, 1982 [DE] Fed. Rep. of Germany ....... 3234851

[51] Int. Cl.³ ............................................. G01B 3/22
[52] U.S. Cl. ............................ 33/169 R; 33/180 R; 33/559
[58] Field of Search ............. 33/169 R, 174 L, 172 D, 33/172 E, 172 B, 147 L, 169 C, 180 R; 16/361, 366, 367, 281, 282, 283, 287, 288

[56] References Cited

U.S. PATENT DOCUMENTS

| 3,869,799 | 3/1975 | Never et al. | 33/169 R |
| 3,991,477 | 11/1976 | Zipin et al. | 33/172 E |
| 4,279,080 | 6/1981 | Nakaya | 33/169 R |
| 4,451,987 | 6/1984 | Cusack | 33/174 L |
| 4,462,162 | 7/1984 | McMurtry | 33/174 L |

Primary Examiner—Charles Frankfort
Assistant Examiner—Patrick Scanlon
Attorney, Agent, or Firm—McGlew and Tuttle

[57] ABSTRACT

A dynamic feeler head comprising a central feeler pin and suitable particularly for being used in machine tools and measuring units in workshops, has definite tilting axes in the coordinate directions x and y and is subject to definite tilting forces, and ensures well reproducible measuring movements. The feeler pin 2 is tiltable in the coordinate directions x or y about axes, which extend in a common horizontal plane and are spaced from the pin always by the same distance. The tilting axes are embodied by hinges made of leaf springs, by which five plates extending one above the other are connected to each at their side edges.

4 Claims, 5 Drawing Figures

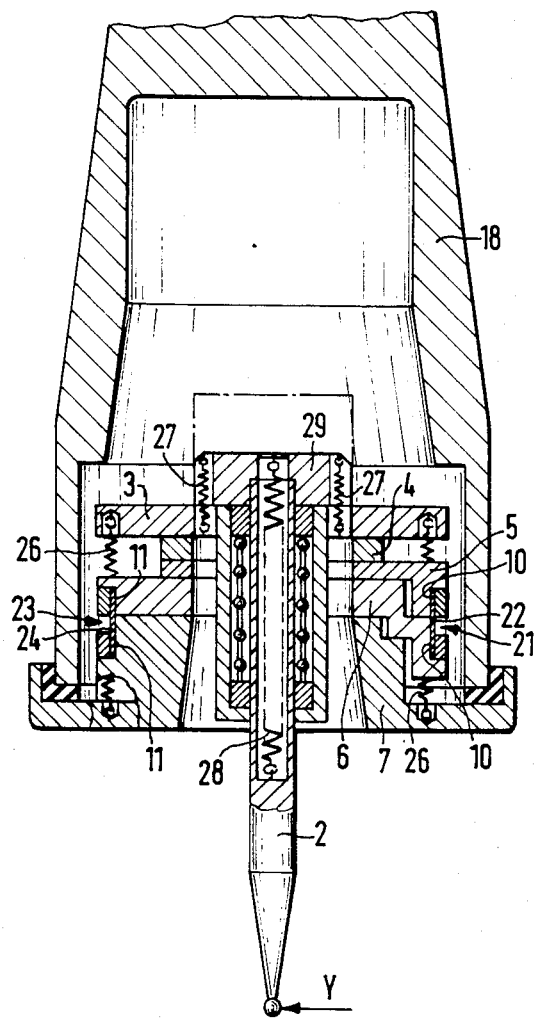

DYNAMIC FEELER HEAD

FIELD AND BACKGROUND OF THE INVENTION

This invention relates in general to the construction of a feeler and in particular to a new and useful dynamic feeler for measuring machines and as measuring equipment in machine tools.

From German Pat. Nos. 23 47 633, 23 65 984 and 27 42 817, there are known tilting feelers in a three-point contact design. This three-point mounting does allow movement of the measuring pin by tilting the supporting plate about a transversely extending axis, however, just because of the three-point contact, this tilting axis is not definite. On the other hand, feeler heads in measuring devices and machine tools require an exactly determined tilting axis.

SUMMARY OF THE INVENTION

The invention is directed to a feeler head having definite tilting axes in the x and y coordinate directions, being moved into its measuring position by definite forces, and ensuring a satisfactory reproducibilty.

In accordance with the invention, a dynamic feeler for measuring machines and its measuring equipment in machine tools comprises a feeler head housing having a feeler pin centrally carried within the housing which can be displaced in three coordinate directions x, y and z. The feeler is advantageously associated with equipment for transmitting signals electromechanically, inductively or optically. The feeler pin is tiltable in the coordinate directions x and y about axes which are spaced from the pin always by the same distance which always extend in the same plane. This pin is displaceable linearly against a action of the spring along the coordinate z axis.

The feeler head advantageously includes a housing with one end having a recess with a plurality of plates therein which have side edges which are disposed in an x plane and some of which are also disposed in a y plane. Spring members forming tilting axes hinges interconnect adjacent ones of the plates in each of the side edge planes. Tension spring means hold the plates in superjacent juxtaposition. The feeler pin is carried by or is supported by the plates. Support spring means are connected between the plates and the feeler pin permitting linear movement of the feeler pin in the z axis. The feeler pin is tiltable with respective ones of the plates about respective coordinate directions x and y about associated axes spaced from the pin by definite distance.

The construction includes five separate plates and the hinges are arranged in separate x and y planes comprising four separate hinges for interconnecting two respective plates. The plates are disposed one over the other and are provided with lever arms of equal lengths through which respective ones of second, third and fourth plates are hinged both to the respective superjacent plate at a side offset through 90° to the respective subjacent plate. Instead of a central third plate, optionally either a second or fourth plate may be connected through the 90° offset hinge to a respective superjacent and subjacent plate.

Upon moving the feeler pin in the coordinate directions x and y the forces transmitted from the first plate in a stack through the hinge to a second plate and from the second plate through the opposite side hinge to a third plate and from the third plate through a hinge which is offset 90° relative to the second plate to the fourth plate and from the fourth plate through an opposite hinge to the fifth plate. The hinges are advantageously formed by leaf springs which are secured between two superjacent plates. The hinges are formed by matching recesses which are provided in every two associated superjacent plates and extend parallel to the coordinate directions x and y. Balls or rollers may be advantageously positioned between the plates as tilting elements.

To produce a definite displacing force in the coordinate directions x and y, superjacent plates are held in their rest positions by springs which are provided at the four corner points of the plates and are subject to tension. In the z coordinate direction the feeler pin is movable both against the action of inserted springs and along the whole stack of superjacent plates linearly upwardly.

This inventive feeler head comprising a central, horizontally and vertically useable feeler pin can be manufactured in a simple way and requires very little space. The five plates making it possible to tilt the feeler pin in the x, y coordinate directions, are in direct contact with each other by their large surfaces and are secured by their side faces to thin leaf springs through which they allow the tilting of the feeler pin. Since the tilting or hinge axes are permanently at a constant distance from the centrally extending feeler pin, the lever arms and thus also the forces causing the displacement remain constant. Finally, the constant displacement or tilting forces and the uniform design of the tilting mechanism make sure that the operation of the feeler and the results of measurement are reproducible.

Accordingly, it is an object of the invention to provide an improved dynamic feeler for measuring machines which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a section taken along the line V—V of FIG. 3.

DESCRIPTION OF THE PREFERRED EMBODIMENTS

Figure 1:
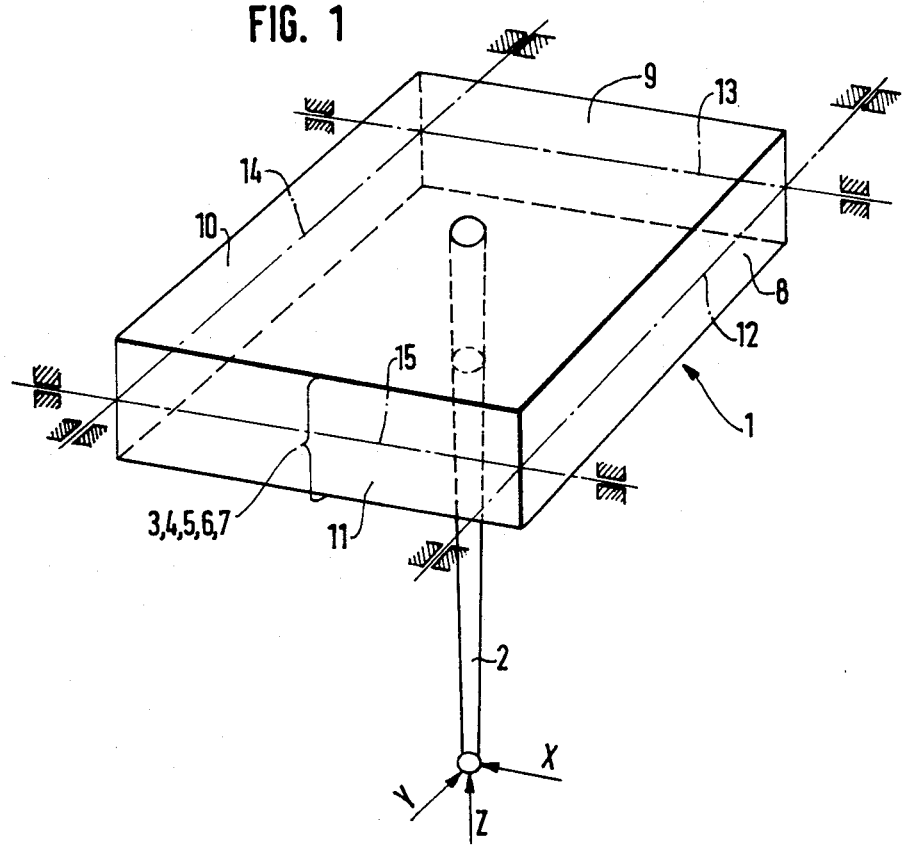
FIG. 1 is a diagrammatical perspective view of a feeler head.

Referring to the drawings in particular the invention embodied therein comprises a dynamic feeler head used in measuring units and machine tools which comprises a feeler head housing 18 having one end with a recess into which a plurality of plates 3,4,5,6 and 7 are positioned in superposed juxtaposition. The plates have side edges, some of which are disposed in an x plane and some of which are disposed in a y plane. Spring members form tilting axis hinges 16,17,21 and 23 which interconnect adjacent ones of the plates in each of the x and y planes. Tension spring means hold the plates in superjacent juxtaposition and includes springs 26. A feeler pin 2 is carried by is supported by the plates 3,4,5,6 and 7. Support spring means includes springs 27 and 28 which are connected between the plates and the feeler pin and permit linear movement of the feeler pin along the z axis.

Figure 2:
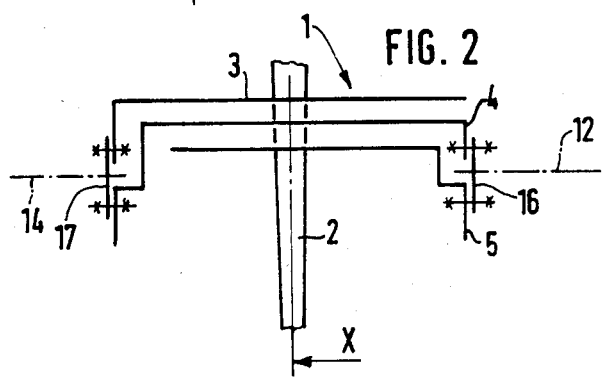
FIG. 2 is a diagrammatical illustration of two of the hinge axes.

The function of the inventive feeler head will now be explained with reference to FIGS. 1 and 2.

Feeler head 1 comprises a centrally arranged feeler pin 2, and a stack of superimposed plates 3,4,5,6,7 which are connected to each other by hinge elements which are provided at all four side edges 8,9,10,11 of the plates, and whose hinge axes 12,13, 14,15 extend all in the same plane. This means that upon displacing, i.e., tilting feeler pin 2 in one of the coordinate directions x or y, the stack of plates of feeler head 1 slants about one of hinge axes 13,14,15,16. If feeler pin is pivoted in the x direction according to FIG. 2, the plate stack tilts about hinge 16 in tilting axis 12. In consequence, plates 3 and 4, which are connected to each other by hinge 17, are swung upwardly. Plate 5 remains in its shown rest position. If feeler pin 2 is pivoted against direction x, the system tilts in hinge 17 about tilting axis 14, with plate 3 swinging up at the same time. Plates 4 and 5 remain in their shown rest position. The deflection in the y direction takes place in the same way as in the x direction. What is substantial is that the tilting axes 12,13,14,15 always extend in the same plane and that the lever arms from feeler 2 to hinge axis 12,13,14,15 have permanently a constant length. This necessarily results in constant tilting forces and a satisfactory reproducibility. The change of tilt of plates 3 and 4 from the x coordinate to the y coordinate of plates 6 and 7 is made possible by plate 5 which alone has two hinges which are offset through 90° from each other. Therefore, at this location, the system can tilt about both the x axis and the y axis.

Figure 3:
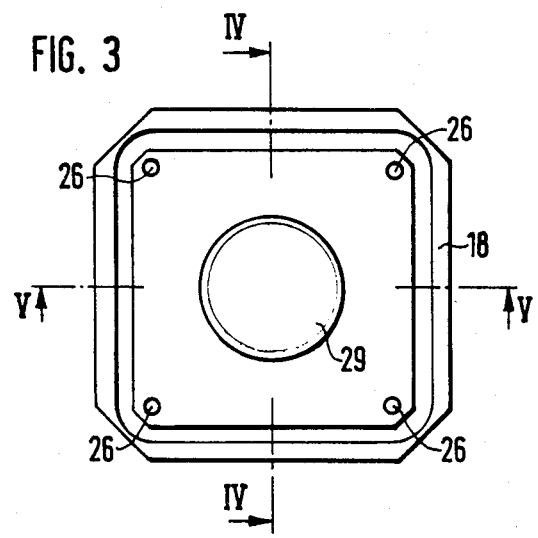
FIG. 3 is a top plan view of a feeler head.
Figure 4:
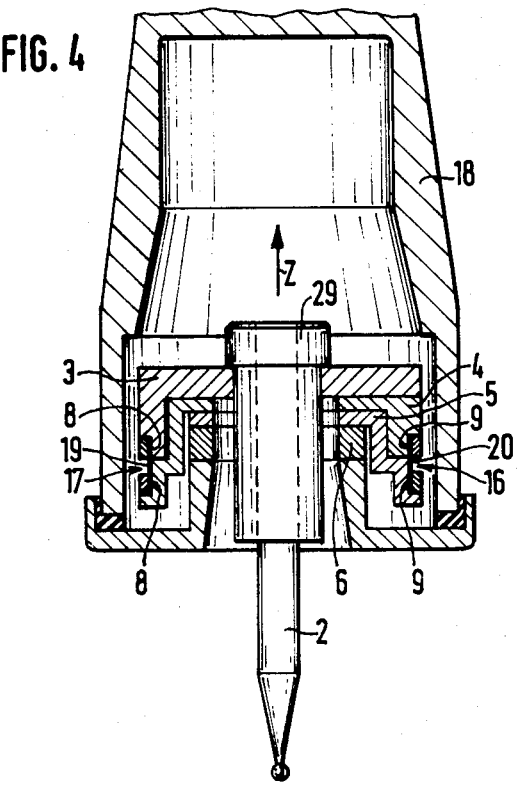
FIG. 4 is a sectional view taken along the line IV—IV of FIG. 3.

FIGS. 3, 4 and 5 show a specific embodiment of an inventive feeler head. The top plan view of FIG. 3 is substantially intended to explain the views of FIGS. 4 and 5.

Inserted in the housing 18 of a feeler head are five plates 3, 4, 5, 6, 7 which extend over one another and are all angled or have skirt portions at one of their side edges. Plate 3 applies against plate 4 and is connected thereto through a hinge 17.

Hinge 17 is formed by a leaf spring 19 which extends over the entire side faces 8 of plates 3 and 4. Plate 4 in turn applies against plate 5 to which it is connected through hinge 16 which is formed by a leaf spring 20 secured to side faces 9. At its other side turned through 90°, plate 5 is further connected to plate 6, through hinge 21 formed by a leaf spring 22 secured to side faces 10. On the opposite side, a hinge 23 is provided formed by leaf spring 24 which is secured to side faces 11 of plates 6 and 7. Feeler pin 2 extends at the center of the head and is connected through plates 3, 4, 5, 6, 7, so that any pivoting or tilting of the feeler pin in the direction of coordinate axis x, y produces a slanting of the plates through the hinges.

The hinges formed by leaf springs are all provided in the same plane.

Upon tilting feeler pin 2, the tilting force is transmitted from plate 3 through hinge 17 to plate 4. It is further transmitted through hinge 16 to plate 5. So far, the transmission may be followed in FIG. 4. The further transmission to hinge 21 may be learned from FIG. 5 showing plate 5 turned through 90°. Through hinge 21, the force is transmitted to plate 6, and then through hinge 23 to plate 7.

To obtain exactly defined tilting forces, four tension springs 26 are provided at the corner points of the plates. Consequently, the feeler pin 2 is returned or urged into its initial position not only by the hinges, but also, in a predetermined manner, by tension springs 26.

In the z coordinate direction, feeler pin 2 is displaced against the action of springs 27 and opposite spring 28, which are inserted in the interior of the pin. This displacement of pin 2 is limited by a stop provided on housing 18, against which a cover member 29 of the pin butts. However, a further displacement is possible in this direction of the z coordinate namely along with the entire stack of plates, against the action of springs 26.

While specific embodiments of the invention have been shown and described in detail to illustrate the application of the principles of the invention, it will be understood that the invention may be embodied otherwise without departing from such principles.

What is claimed is:

1. A dynamic feeler head having four side edges for use in measuring units and machine tools, comprising a feeler head housing having one end with a recess, a plurality of plates having side edges some of which are disposed in an X-plane and some of which are disposed in a Y-plane, said plates comprising a first, second, third, fourth and fifth plate disposed in said recess and arranged in superposed juxtaposition, tension springs means connected to said plates for holding said plates in superposed juxtaposition, a feeler pin carried by said plates, and support spring means connected between said plates and said feeler pin for permitting a linear movement of said feeler pin along a Z-axis, a plurality of spring members forming tilting axis hinges and interconnecting adjacent ones of said plates to each other, said plates having lever arms between said feeler pin and said tilting axis hinges which are of mutually equal lengths, each of said second, third, and fourth plates being hinged by its respective lever arm and through a respective tilting axis hinge to both a respective superjacent plate and, on a side offset through 90°, to a respective subjacent plate so that feeler pin is tiltable with respect to ones of said plates about respective coordinate directions in the X and Y plane, said tilting axis hinges all being spaced from said feeler pin by a known distance, said plates each having side faces all of which are equidistantly spaced from said feeler pin which is centrally arranged with respect to said plates, said side faces extending parallel to the coordinate directions in the X and Y plane, all of said tilting axis hinges lying in a common plane with one of said tilting axis hinges extending in each of said four side edges of the feeler head.

2. A dynamic feeler head according to claim 1, wherein said axis hinges include a first axis hinge connected between said first and second plates and a second axis hinge connected between said second and third plates, said first and second axis pins lying on opposite sides of said first, second and third plates and extending in one of said X and Y planes, a third axis hinge connected between said third and fourth plates and a fourth axis hinge connected between said fourth and fifth plates, said third and fourth axis hinges extending at 90° to said first and second axis hinges and lying on opposite sides of said third, fourth and fifth plates.

3. A dynamic feeler head according to claim 1, wherein said tilting axis hinges each comprise a leaf spring.

4. A dynamic feeler head according to claim 1, wherein said tension spring means comprises a separate tension support spring at each corner of said plate.

* * * * *